US010135931B2

(12) United States Patent
Tseng et al.

(10) Patent No.: US 10,135,931 B2
(45) Date of Patent: Nov. 20, 2018

(54) RECOMMENDATIONS BASED ON GEOLOCATION

(71) Applicant: Facebook, Inc., Menlo Park, CA (US)

(72) Inventors: Erick Tseng, San Francisco, CA (US); Matthew Cahill, San Francisco, CA (US); Neel Ishwar Murarka, Menlo Park, CA (US); Charles Jolley, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/993,534

(22) Filed: Jan. 12, 2016

(65) Prior Publication Data

US 2016/0127485 A1 May 5, 2016

Related U.S. Application Data

(63) Continuation of application No. 13/674,700, filed on Nov. 12, 2012, now abandoned, which is a (Continued)

(51) Int. Cl.
*G06F 15/16* (2006.01)
*H04L 29/08* (2006.01)
(Continued)

(52) U.S. Cl.
CPC ............ *H04L 67/18* (2013.01); *G06Q 10/10* (2013.01); *G06Q 30/0242* (2013.01); *G06Q 30/0255* (2013.01); *G06Q 30/0261* (2013.01); *G06Q 30/0267* (2013.01); *G06Q 30/0269* (2013.01); *G06Q 50/01* (2013.01); *H04L 29/06* (2013.01); *H04L 65/4084* (2013.01); *H04L 67/22* (2013.01); *H04L 67/306* (2013.01); *H04W 4/02* (2013.01); *H04W 4/21* (2018.02)

(58) Field of Classification Search
CPC .... G06Q 50/01; G06Q 30/02; G06Q 30/0261; G06Q 30/0259; G06Q 30/0282; G06Q 30/0631; G06Q 30/0277; G06Q 10/10; G06Q 30/0224; G06Q 30/0269; G06Q 40/00; G06Q 10/025; G06Q 30/0203; G06Q 30/0204; G06Q 30/0242; G06Q 30/0246
USPC ................................. 709/203, 223–229, 250
See application file for complete search history.

(56) References Cited

U.S. PATENT DOCUMENTS

2006/0200435 A1* 9/2006 Flinn .................... G06N 99/005
706/12
2011/0010364 A1* 1/2011 Ahtisaari .......... G06F 17/30867
707/724

(Continued)

*Primary Examiner* — John B Walsh
(74) *Attorney, Agent, or Firm* — Baker Botts L.L.P.

(57) ABSTRACT

In one embodiment, a method includes accessing geolocation data indicating a current geolocation of a client device of a user; identifying one or more categories of interest to the user based at least in part on social information of the user; identifying one or more objects based at least in part on the current geolocation; and determining one or more recommendations for the user based at least in part on a calculated interest value of each identified object. The calculated interest value is based at least in part on the identified categories of interest to the user. The method also includes providing the recommendations for transmission to the client device. The recommendations include one or more of the identified objects.

42 Claims, 8 Drawing Sheets

Related U.S. Application Data continuation-in-part of application No. 13/198,071, filed on Aug. 4, 2011, now Pat. No. 9,691,073.

(51) Int. Cl.
| | |
|---|---|
| *G06Q 30/02* | (2012.01) |
| *H04W 4/21* | (2018.01) |
| *G06Q 10/10* | (2012.01) |
| *H04L 29/06* | (2006.01) |
| *H04W 4/02* | (2018.01) |
| *G06Q 50/00* | (2012.01) |
| *G06F 12/00* | (2006.01) |

(56) References Cited

U.S. PATENT DOCUMENTS

| | | | |
|---|---|---|---|
| 2011/0314084 A1* | 12/2011 | Saretto | G06F 17/30867 709/203 |
| 2012/0036015 A1* | 2/2012 | Sheikh | G06Q 30/02 705/14.54 |
| 2012/0166303 A1* | 6/2012 | Godwin | G06Q 30/0631 705/26.7 |
| 2013/0007124 A1* | 1/2013 | Sweeney | G06F 17/2785 709/204 |
| 2013/0030925 A1* | 1/2013 | Calman | G06Q 40/00 705/14.66 |
| 2013/0030994 A1* | 1/2013 | Calman | G06Q 40/00 705/40 |
| 2013/0073400 A1* | 3/2013 | Heath | G06Q 30/02 705/14.73 |
| 2013/0073422 A1* | 3/2013 | Moore | G06Q 10/10 705/26.7 |
| 2014/0067937 A1* | 3/2014 | Bosworth | H04L 65/403 709/204 |

* cited by examiner

RECOMMENDATIONS BASED ON GEOLOCATION

RELATED APPLICATION(S)

This application is a continuation under 35 U.S.C. § 120 of U.S. patent application Ser. No. 13/674,700, filed 12 Nov. 2012, which is a Continuation in Part under 35 U.S.C. § 120 of U.S. patent application Ser. No. 13/198,071, filed Aug. 4, 2011, which is hereby incorporated by reference in its entirety and for all purposes.

TECHNICAL FIELD

This disclosure generally relates to social networking, and in particular to providing relevant information for a user of a social networking system based on user location and social information.

BACKGROUND

Social networking systems have become prevalent in recent years because they provide a useful environment in which users can connect to and communicate with other users. A variety of different types of social networking systems exist that provide mechanisms allowing users to interact within their social networks. In this context, a user may be an individual or any other entity, such as a business or other non-person entity. Accordingly, while enabling social communications among friends, a social networking system can also be a valuable tool for businesses to engage with potential consumers.

However, users of social networking systems traditionally have not been able to obtain information that is relevant and timely based on their interests, connections to others, and particular locations. Users have not yet been able to benefit from the relationships and connections among members of a social networking website, nor the rich user information contained therein, in a meaningful way. Similarly, third-party content providers, such as businesses, also have not been able to utilize social networking systems to provide information at the appropriate time and place to best take advantage of a potential customer's interest.

SUMMARY OF PARTICULAR EMBODIMENTS

Particular embodiments enable a computing device to provide recommendations to a user based on his social connections and location. In practice, a computing device receives the geographic location of a mobile device associated with a user of a social-networking service. In some embodiments, the geographic location is collected via passive location logging technologies. In other embodiments, the geographic location may be provided by the user. The computing device may then cross-reference the geographic location associated with the user against a social graph of nodes associated with geographic locations to make suggestions for content, applications, or actions that the user may be interested in. In some embodiments the computing device may limit the suggestions based on the physical distance between the user's location and the geographic location associated with the nodes of the social graph.

Additionally, in some embodiments, the computing device may limit the suggestions based on the user's social graph in order to generate suggestions of greater relevance to the user. For example, the computing device may only select suggestions associated with nodes within a specified degree of separation for the user's node. In other embodiments, the computing device may only select suggestions associated with nodes connected to the user's node via edges instigated by the user.

In particular embodiments, suggestions can be downloading a software application to the user's mobile device, contacting another user of the social-networking system who is nearby, viewing an image or video associated with a location, or traveling to another location of interest. For instance, the computing device may suggest that a user patronize a local restaurant where a friend is currently eating. As another example, the computing device may suggest that the user download a San Francisco 49'ers® application while attending a football game. Alternatively, the computing device may suggest that the user view photographs taken at the user's current location by a family member of the user. This may allow the computing device to provide the user with customized and relevant suggestions of greater value to the user.

DESCRIPTION OF EXAMPLE EMBODIMENTS

Overview of a Social Networking System Network

Figure 1:
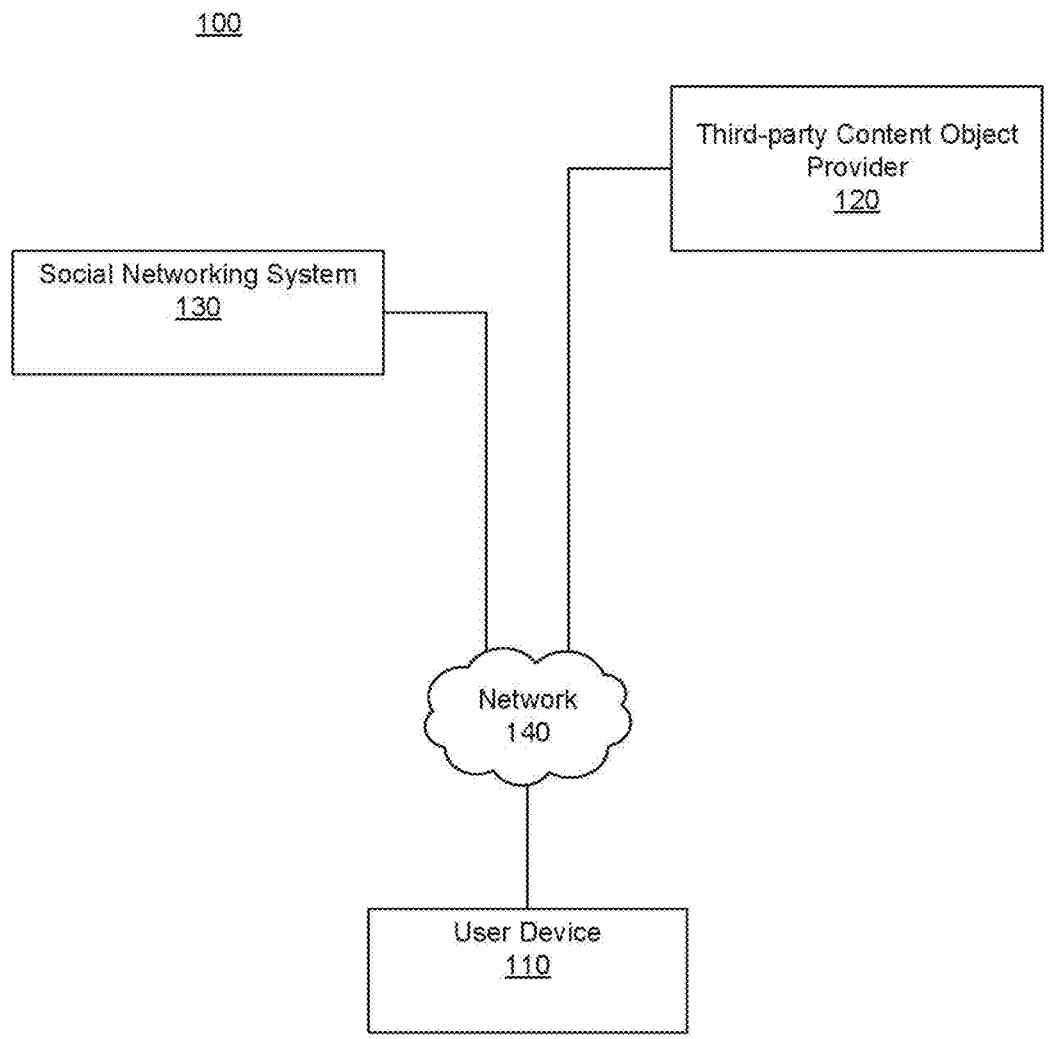
FIG. 1 illustrates a network diagram of one embodiment of a system for responding to the requests of social networking system user regarding nearby, relevant activities.

FIG. 1 is a network diagram of one embodiment of a system for responding to the requests of social networking system user (e.g., member) regarding nearby, relevant activities. The system 100 includes one or more user devices 110, one or more third-party content object provider 120, the social networking system 130 and a network 140. For purposes of illustration, the embodiment of the system 100 shown by FIG. 1 includes a single third-party content object provider 120 and a single user device 110. However, in other embodiments, the system 100 may include more user devices 110 and/or more third-party content object providers 120. In certain embodiments, the social networking system 130 is operated by the social network provider, whereas the third-party content object providers 120 are separate from the social networking system 130 in that they may be operated by different entities. In various embodiments, however, the social networking system 130 and the third-party content object providers 120 operate in conjunction to provide social networking services to users of the social networking system 130. In this sense, the social networking system 130 provides a platform, or backbone, which other systems, such as third-party content object providers 120, may use to provide social networking services and functionalities to users across the Internet.

A user device 110 comprises one or more computing devices that can receive input from a user and can transmit and receive data via the network 140. For example, the user device 110 may be a desktop computer, a laptop computer, a smart phone, a personal digital assistant (PDAs) or any other device including computing functionality and data communication capabilities. The user device 110 is configured to communicate with the third-party content object provider 120 and the social networking system 130 via the network 140, which may comprise any combination of local area and/or wide area networks, using both wired and wireless communication systems. In one embodiment, the user device 110 displays content from the third-party content object provider 120 and/or from the social networking system 130.

The third-party content object provider 120 comprises one or more sources of content objects, which are communicated to the user device 110 at appropriate times. In one embodiment, the third-party content object provider 120 is a separate entity from the social networking system 130. For example, the third-party content object provider 120 is associated with a first domain while the social networking system 130 is associated with a separate social networking domain. In various embodiments, the third-party content object provider 120 is located on a website or alternatively a server, separate or in conjunction from the website or server that hosts the social networking system 130.

The third-party content objects, as the term is used herein, include any content object generated by a third-party content object provider 120 rather than by a user of the social networking system 130. Content objects generally may include information regarding things or activities of interest to the user. Third-party content objects include informational content objects, such as movie show times, movie reviews, restaurant reviews, restaurant menus, product information and reviews, etc., as well as incentive content objects, such as coupons, discount tickets, gift certificates, etc. according to one embodiment. In addition, some third-party content objects may include a combination of information and incentives. Other examples of content objects include event content objects associated with an event (e.g., a New Year's Eve party) or ad-hoc gathering objects (e.g., an impromptu gathering of 100 people in Union Square, San Francisco). Examples of content objects and the ways in which content objects may be presented or used are described below.

The social networking system 130 comprises one or more computing devices storing a social network, or a social graph, comprising a plurality of users and providing users of the social network with the ability to communicate and interact with other users of the social network. According to various embodiments, the social networking system 130 may comprise a website, or alternatively a server that can be accessed through a wired or wireless network 140 by user devices 110 or third-party content object providers 120. In use, users join the social networking system 130 and then add connections (i.e., relationships) to a number of other users of the social networking system 130 to whom they desire to be connected. As used herein, the term "friend" refers to any other user of the social networking system 130 to whom a user has formed a connection, association, or relationship via the social networking system 130. Connections may be added explicitly by a user or may be automatically created by the social networking systems 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral, or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees or separation. Using a social graph, therefore, a social networking system may log many different types of objects and the interactions and connections among those objects, thereby maintaining an extremely rich store of socially relevant information.

In addition to establishing and maintaining connections between users and allowing interactions between users, the social networking system 130 provides users with the ability to take actions on various types of items, or objects, supported by the social networking system 130. These items may include groups or networks (where "networks" here refer not to physical communication networks, but rather social networks of people, entities, and concepts) to which users of the social networking system may belong, events or calendar entries in which a user might be interested, computer-based applications that a user may use via the social networking system 130, transactions that allow users to buy or sell items via the service, and interactions with advertisements that a user may perform on or off the social networking system.

These are just a few examples of the items upon which a user may act on a social networking system, and many others are possible. A user may interact with anything that is capable of being represented in the social networking system 130 or by an external system of the third-party content object provider 120, which is separate from the social networking system 130 and coupled to the social networking system 130 via a network 140.

The social networking system 130 is also capable of linking a variety of entities. For example, the social networking system 130 enables users to interact with each other as well as receive content from third-party content object providers 120 or other entities, or to allow users to interact with these entities through an API or other communication channels.

The social networking system 130 also includes user-generated content objects, which enhances a user's interactions with the social networking system 130. User-generated content may include anything a user can add, upload, send, or "post," to the social networking system 130. For example, a user communicates posts to the social networking system 130 from a user device 110. Posts may include data such as status updates or other textual data, location information, photos, videos, links, music or other similar data and/or media. Content may also be added to the social networking system 130 by a third-party through a "communication channel," such as a newsfeed or stream.

Content objects, generally, represent single pieces of content that are represented as objects in the social networking system 130. In this way, users of the social networking system 130 are encouraged to communicate with each other by posting text and content objects of various types through various communication channels, increasing the interaction of users with each other and increasing the frequency with which users interact with the social networking system 130.

Social Networking System Architecture

Figure 2:
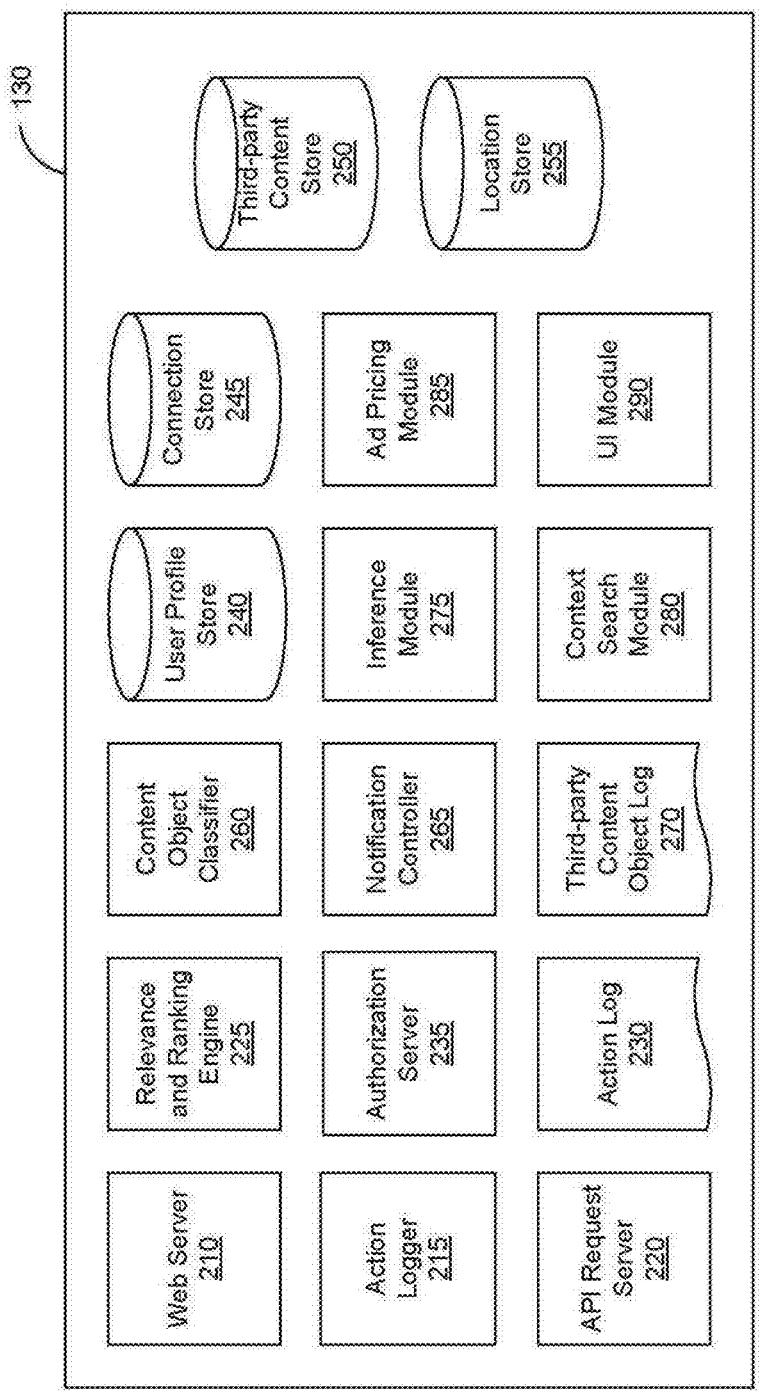
FIG. 2 illustrates an example of a social networking system, in accordance with an embodiment of the invention.

FIG. 2 is a diagram of one embodiment of a social networking system 130. The embodiment of a social networking system 130 shown by FIG. 2 includes a web server 210, an action logger 215, an API request server 220, a relevance and ranking engine 225, a content object classifier 260, a notification controller 265, an action log 230, a third-party content object exposure log 270, an inference module 275, an authorization server 235, a search module 280, an ad targeting module 285, a user interface module 290, a user profile store 240, a connection store 245, a third-party content store 250, and a location store 255. In other embodiments, the social networking system 130 may include additional, fewer, or different modules for various applications. Conventional components such as network interfaces, security mechanisms, load balancers, failover servers, management and network operations consoles, and the like are not shown so as to not obscure the details of the system.

As described above in conjunction with FIG. 1, the social networking system 130 comprises a computing system that allows users to communicate or otherwise interact with each other and access content as described herein. The social networking system 130 stores user profiles describing the users of a social network in a user profile store 240. The user profiles include biographic, demographic, and other types of descriptive information, such as work experience, educational history, hobbies or preferences, interests, location, and the like. For example, the user profile store 240 contains data structures with fields suitable for describing a user's profile. When a new object of a particular type is created, the social networking system 130 initializes a new data structure, i.e., a "node" of the corresponding type, assigns a unique object identifier to it, and begins to add data to the object as needed. This might occur, for example, when a user becomes a user of the social networking system 130, the social networking system 130 generates a new instance of a user profile in the user profile store 240, assigns a unique identifier to the user profile, and begins to populate the fields of the user profile with information provided by the user.

In addition, the user profile store 240 may include data structures suitable for describing a user's demographic data, behavioral data, and other social data. Demographic data typically includes data about the user, such as age, gender, location, etc., e.g., as included in the user's profile. Behavioral data typically includes information about the user's activities within the social networking system 130, such as specific actions (posts, likes, comments, etc.), activity levels, usage statistics, etc. Other social data comprises information about the user from within the social networking system 130 that is not strictly demographic or behavioral, such as interests or affinities, etc. In one embodiment, user's interests may be explicitly specified in the user's profile or interests that may be inferred from the user's activities in the social networking system (e.g., uploaded content, postings, reading of messages, etc). Additionally, the user profile store 240 includes logic for maintaining user interest information for users according to one or more categories. Categories may be general or specific, e.g., if a user "likes" an article about a brand of shoes the category may be the brand, or the general category of "shoes" or "clothing." Multiple categories may apply to a single user interest. In addition, the user profile store 240 may be accessed by other aspects of the social networking system 130.

For example, the user profile store 240 includes logic for maintaining interest information for users according to one or more categories. Categories may be general or specific, e.g., if a user "likes" an article about a brand of shoes the category may be the brand, or the general category of "shoes" or "clothing." Multiple categories may apply to a single user interest. In addition, the user profile store 240 may be accessed by other aspects of the social networking system 130.

The social networking system 130 further stores data describing one or more connections between different users in a user connection store 245. The connection information may indicate users who have similar or common work experience, group memberships, hobbies, educational history, or are in any way related or share common attributes. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. The connection store 245 includes data structures suitable for describing a user's connections to other users, connections to third-party content object providers 120, or connections to other entities. The connection stores 245 may also associate a connection type with a user's connections, which may be used in conjunction with the user's privacy setting, to regulate access to information about the user. In addition, the connection store 245 may be accessed by other aspects of the social networking system 130.

The web server 210 links the social networking system to one or more user devices 110 and/or one or more third-party content object providers 120 via the network 140. The web server 210 serves web pages, as well as other web-related content, such as Java, Flash, XML, and so forth. The web server 210 may include a mail server or other messaging functionality for receiving and routing messages between the social networking system 130 and one or more user devices 110. The messages can be instant messages, queued messages (e.g., email), text and SMS messages, or any other suitable messaging format.

The Application Programming Interface (API) request server 220 allows one or more third-party content object providers 120 to access information from the social networking system 130 by calling one or more APIs. The API request server 220 also may allow third-party content object providers 120 to send information to the social networking system by calling APIs. For example, a third-party content object provider 120 sends an API request to the social networking system 130 via the network 140 and the API request server 220 receives the API request. The API request server 220 processes the request by calling an API associated with the API request to generate an appropriate response, which the API request server 220 communicates to the third-party content object provider 120 via the network 140.

The action logger 215 is capable of receiving communications from the web server 210 about user actions on and/or off the social networking system 130. The action logger 215 populates the action log 230 with information about user actions, allowing the social networking system 130 to log various actions taken by its users within the social networking system 130 and outside of the social networking system 130. Any action that a particular user takes with respect to another user is associated with each user's profile, through information maintained in the action log 230 or in a similar database or other data repository. Examples of actions taken by a user within the social network 130 that are identified and stored may include, for example, adding a connection to another user, sending a message to another user, reading a message from another user, viewing content associated with another user, attending an event posted by another user or other actions interacting with another user. When a user takes an action within the social networking system 130, the action is recorded in the action log 230. In one embodiment, the social networking system maintains the action log 230 as a database of entries. When an action is taken within the social networking system 130, an entry for the action is added to the action log 230. The relevance and ranking engine 225 includes logic for calculating a relevance score for content objects (including both user-generated content objects and third-party content objects) relative to a user, for ranking the content objects by their relevance scores, and for selecting content objects for sending to users as notifications or as responses to user requests. To calculate the relevance score, the relevance and ranking engine 225 determines a location value by comparing the content object location and a current location for the user device 210, determines an interest value based on whether the content object categories are included in the user's interests, determines a time value based on whether the current time is within the delivery time range for the content object, and determines a connection value based on how many of the user's connections are associated with the content object. Then, the relevance and ranking engine 225 combines the location value, interest value, connection value, and time value to determine the relevance score for the content object with respect to the user. In one embodiment the values are higher for a better fit (closer proximity, great similarity, etc.) and approach a value of one, and are multiplied together to yield the relevance score. From the relevance scores for each content object, the relevance and ranking engine 225 ranks the content objects for a user, e.g., from highest relevance score to lowest. The relevance and ranking engine 225 then can select content objects to send to a notification controller 265, or can serve the highest ranked content object directly to the user device 110 as a notification(s).

The content object classifier 260 includes logic for assigning each of the content objects a location, a category, and a delivery time range. Categories may reflect various categories of user interests, and may be associated with the interests themselves, e.g., a user "likes" an article about a brand of shoes and the category is the brand, or the article about the shoe brand is assigned a general category of "shoes" or "clothing." Multiple categories may apply to a single content object. General or specific locations may be assigned to content objects as well, e.g., a city, a particular street name or intersection, or GPS coordinates. A delivery time range is assigned to each content object, e.g., using a useful range based on the hours the associated business is open.

Additionally, user actions may be associated with exposure to third-party content objects from one or more third-party content object providers 120. Thus, in conjunction with the action log 230, a third-party content object log 270 is maintained of user exposures to such objects and when the last exposure occurred. The action logger 215 receives data describing a user's interaction with an object and stores it to the third-party content object log 270. The third-party content object log 270 includes logic for storing user exposures to third-party content objects and associations between users and objects. The exposure information can be used to determine whether to expose the user to the same or similar content objects, and for adjusting the ranking and selection of content objects on the basis of whether the user previously has been exposed to the same or similar content object. In addition, if a user becomes associated with a content object via an action, e.g., uses an incentive, goes to the location, etc., that information also is stored, and can be used for re-ranking and re-selecting the content objects.

The notification controller 265 provides information regarding content objects to the user device 110. Information may be pushed to the user device 110 as notifications, or information may be pulled to the user device responsive to a request received from the user device 110. In the push circumstance, notifications of content objects are initially pushed according to a default rate. Based on user engagement with the notifications, the notification controller 265 may adjust the rate in which notifications are provided to the user device 110. By adjusting the initial settings, the notification controller 265 provides notifications of content objects to the user device 110 when the user is more likely to engage with the notifications. Information may be pulled to the user device at any time. Additionally, the type of content that is provided to the client device 110 may be updated based on the user engagement.

The authorization server 235 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external websites or any entity that can potentially access the information. The information that can be shared by a user comprises user profile information like profile photo, phone numbers associated with the user, user's connections, actions taken by the user such as adding a connection, changing user profile information and the like.

The useful social information that is tracked and maintained by a social networking system can be thought of in terms of a "social graph," which includes a plurality of nodes that are interconnected by a plurality of edges. Each node in the social graph may represent something that can act on and/or be acted upon by another node. Common examples of nodes include users, non-person entities, content objects, groups, events, messages, concepts, and any other things that can be represented by an object in a social networking system. An edge between two nodes in the social graph represents a particular kind of connection between the two nodes, which may result from an action that was performed by one of the nodes on the other node.

The social networking system 130 may receive a request to associate the web content with a node in the social networking system 130. An external website (e.g., of the third party content object provider 130) incorporates a tag into the markup language document for the web page(s) of the web content to claim ownership of the pages/domain in the context of the social networking system 130. In some cases, an entire domain or collection of web pages is associated with a unique identifier that associates the web pages with a node. Once established, the social networking system 130 tracks data associated with the node in the action log 230.

Data stored in the connection store 245, the user profile store 240 and the action log 230 allows the social networking system 120 to generate a social graph that uses nodes to identify various objects and edges connecting nodes to identify relationships between different objects. An edge between two nodes in the social graph represents a particular kind of connection between the two nodes, which may result from an action that was performed by one of the nodes on the other node.

The third-party content object store 250 stores content objects received from third parties. The third-party content objects include informational content objects, such as movie show times, restaurant menus, etc., as well as incentive content objects, such as coupons, discount tickets, gift certificates, etc. In addition, some third-party content objects may include a combination of information and incentives.

The location store 255 stores location information received from user devices 110 associated with users. The location information used by the social networking system 130 may be obtained directly from user devices 110, e.g., at the time a notification is to be sent or at various predetermined time intervals, or the location information may be a last stored location received from the user device 110. In addition, the location store 255 may receive updated location information, e.g., in response to a change in the location of a user device 110. In one embodiment, if an updated location is received, the updated location is provided to the relevance and ranking engine 225 for re-ranking and/or re-selecting the third-party content objects in view of the updated location information.

In general, the selection or ranking of content objects may occur at varying intervals based on several variables, such as always at the beginning of a period during which a notification would be served, or every X minutes during a period during which notifications will be served, or every X minutes all the time (e.g., so that it's ready when a search happens), only in response to a change in location or expiration of a delivery time for a content object, etc. Alternatively, the ranking of content objects may occur as a result of user demand. The user may explicitly request the ranking by submitting a request for relevant information happening within the vicinity of the user. The request may be received in response to user selection of a "refresh" element included in a user application associated with the present disclosure. The request may also be implicit. For example, upon launching of the user application, a request may be automatically received for the ranking.

The social networking system 130 implements context search using a context search module 280. Context search results are search results that are relevant to the user based on their current location as well as their social information. In this way, the context search results are tailored to the user's interests, connections, and location at the time of the search. The context search module 280 incorporates location information, search results and relevance score information obtained from the relevance and ranking engine 225 in order to provide a ranked list of search results and/or for selection of third-party content objects as the basis for serving notifications.

The ad pricing module 285 combines social information, the current time, and location information to provide relevant advertisements, in the form of notifications, to a user. Advertisements of increased relevance to a user are more likely to result in a purchase. Dividing consumers according to their interests based on social information allows merchants to calculate the value of their potential customers. Advertisements provided through the social networking system 130 may be priced according to the value of the customer to the merchant, as indicated by their social information.

In one embodiment, the UI (or User Interface) module 290 is configured to display a map containing pins on a user device 110, where each pin represents a content object in actionable proximity to a user (e.g., a nearby friend, deal, etc.). The content objects selected to be presented as pins to the user are those content objects with sufficiently high relevance scores. Multiple pins for a nearby area can be clustered. The UI module 290 provides the user with the ability to switch between zoom levels for the map, thereby showing pins at varying distances from the user's current location (e.g., nearby, close, and far). In one embodiment, the zoom levels are based on the existence of relevant content rather than being predetermined distances from the user.

In one embodiment, the UI module 290 is configured to display a ranked list of search results on a client device 110 that have been ranked by the context search module 280. The UI module 290 is additionally configured to generate an advertisement dashboard for merchants advertising through the social networking system 130. The advertisement dashboard allows merchants to control the distribution and price they pay for their advertisements. For both functions, the UI module is configured to generate a user interface that a client device 110 or a third-party content object provider (or merchant) 120 may interact with.

An inference module 275 determines overlapping interests between users in the social networking system 130. By determining the overlapping interests between a user and his or her friends, the inference module 275 may identify which interests may be imputed to the user based on the interests of the user's friends. Thus, through the user's friends, the inference module 275 allows the social networking system 130 to identify interests for the user that are not explicitly indicated by the user.

The third-party content object store 250 stores content objects received from third parties. The third-party content objects include informational content objects, such as movie show times, movie reviews, restaurant reviews, restaurant menus, product information and reviews, etc., as well as incentive content objects, such as coupons, discount tickets, gift certificates, etc. In addition, some third-party content objects may include a combination of information and incentives.

The location store 255 stores location information received from user devices associated with users. The location information used by the social networking system 130 may be obtained directly from user devices 110, e.g., at the time a notification is to be sent or at various predetermined time intervals, or the location information may be a last stored location received from the user device 110. The location information may also be obtained along with a request from a user. In addition, the location store 255 may receive updated location information, e.g., in response to a change in the location of a user device 110. In one embodiment, if an updated location is received, the updated location is provided to the relevance and ranking engine 225 for re-ranking and or re-selection of the content objects in view of the updated location information.

Figure 3:
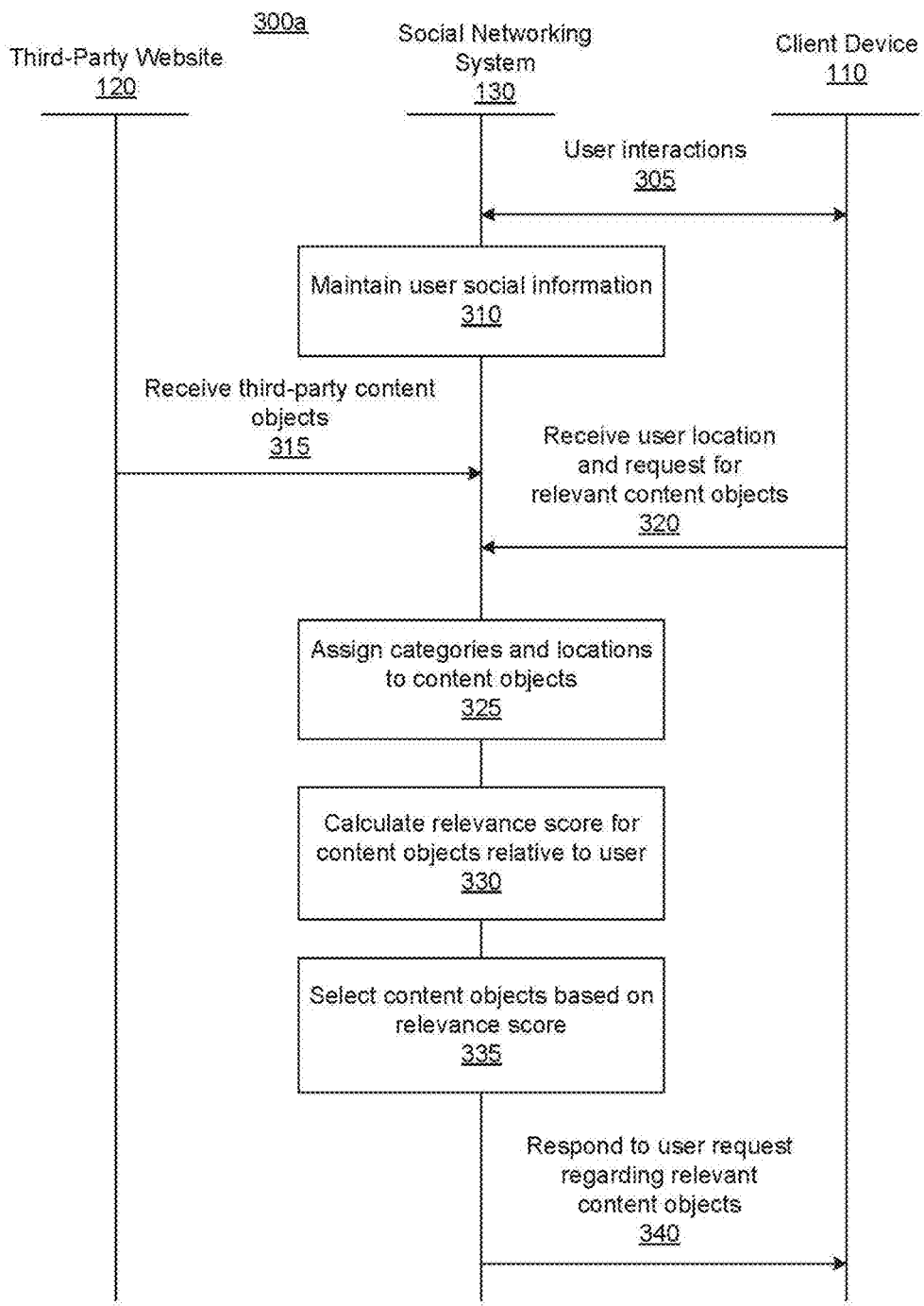
FIG. 3 illustrates an example interaction diagram of one embodiment of a process for responding to a request for information relevant to a user of a social networking system based on user location and social information.

Providing Location Based, Relevant Content Objects for a Social Networking System User FIG. 3 is an interaction diagram of one embodiment of a process for responding to a request for information relevant to a user of a social networking system based on user location and social information.

Initially, users, via user devices 110 interact 305 with each other via the social networking system 130 and with the social networking system 130 directly, providing it information about the user such as user interest and connection information. The social networking system 130 maintains 310 the user social information (e.g., interest and connection information for each user. For example, the social networking system 130 may categorize the interest information into categories.

The social networking system 130 also receives 315 third-party content objects from one or more third parties 120. The third-party content objects may include informational content objects, such as movie show times, movie reviews, sale information, restaurant menus, etc., as well as incentive content objects, such as coupons, discount tickets, gift certificates, etc. In addition, some third-party content objects may include a combination of information and incentives.

The social networking system 130 receives 320 a request from a requesting user for information regarding relevant, nearby content objects. The user request may include information about the location of the user device 110. This information may be obtained directly from the user device 110, e.g., at the time of the request, at the time a notification is to be sent or at various time intervals, or the social networking system 130 may retrieve a last stored location for the user device 110. In addition, when a user device 110 changes locations, the updated location information may be provided to the social networking system 130. Alternatively, the user may provide a location specifying a constraint on the kinds of content objects in which they are interested.

Content objects, (including both user-generated and third-party content objects) are assigned 325 categories, locations, and delivery time ranges. For example, categories may be established by the social networking system 130 that reflect various categories of interests of users of the social networking system 130. The categories may be associated with the interests themselves, e.g., if a user "likes" an article about a brand of shoes, the category may be the brand. Alternatively, the social networking system 130 may assign the article about the shoe brand a general category of "shoes" or "clothing." The social networking system 130 may assign both of these categories to a single content object; thus, multiple categories may apply to a single content object. For example, for an incentive offering 20% off a specialty coffee drink at a particular coffee shop, the promotion may be assigned a category "food," type "beverage," and subtype "coffee." These tags can be matched to categories associated with user interests.

Locations may be assigned to content objects as well. For example, a coupon for $2.00 off of a movie ticket at a particular movie theater chain may apply to all theaters in the chain, or just one theatre. A location may be general, e.g., a city, or specific, e.g., a particular street name, or intersection, or GPS coordinate. One or more such locations are assigned to each content object. Finally, a delivery time range is assigned to a content object. The range may reflect appropriate hours for the item. For example, if the content object is a coupon for a donut store that is open only in the morning, the range for the notification likely would correspond to the hours during which the donut store is open, or some other useful range related to the open hours, e.g., fifteen minutes before opening to thirty minutes before closing.

The social networking system 130 calculates 330 a relevance score for each content object relative to the requesting user. The social networking system 130 uses the location, interest, time, and connection information for the user and the content objects to calculate the score. For example, the social networking system 130 may first calculate scores for each of these categories that are combined to get the relevance score.

In one embodiment, for each content object the social networking system 130 determines a location value based on the proximity between the content object location and a current location associated with the user device 110. The social networking system 130 also determines an interest value based on whether the category or categories assigned to the content object are included in the category or categories associated with the user's interests. The social networking system 130 also determines a time value based on whether the current time is within the delivery time range for the content object. For example, a discount coupon for lunch at a restaurant may be associated with lunch hours and is accordingly of higher interest during the hours commonly associated with lunch. And the social networking system 130 determines a connection value based on how many, if any, of the user's connections are associated with the content object. For example, a connection associated with the content object may include information or an incentive for a business that one of the user's connections is currently at, e.g., a connection of the user is at the frozen yogurt store that the incentive applies to. Then, the social networking system 130 combines the location value, interest value, connection value, and time value to determine the relevance score for the content object with respect to the user. In one embodiment the values are higher for a better fit (closer proximity, great similarity, etc.) and approach one, and are multiplied together to yield the relevance score.

From the relevance scores of the content objects, the social networking system 130 selects 335 the content objects for a user, e.g., from a ranking of highest relevance score to lowest, or by selection of the highest relevance scored items. The social networking system 130 responds to the user's request for relevant content objects. The content objects are provided to the user. In one embodiment, the UI module 290 renders information regarding the content objects, for example in the form of a map with pins. In one embodiment, the social networking system 130 receives a request user from a user for only a single content object. In this case, the social networking system provides the content object with the highest relevance score to the requesting user.

Once a user is exposed to a content object, the social networking system 130 stores that exposure. In addition, the social networking system 130 monitors whether the user uses an incentive associated with the content object, goes to the location of the information, or otherwise becomes associated with the content object, and if so, the social networking system 130 stores that information.

Map with Pins Illustrating Relevant, Nearby Content Objects Requested by a User

Figure 4A:
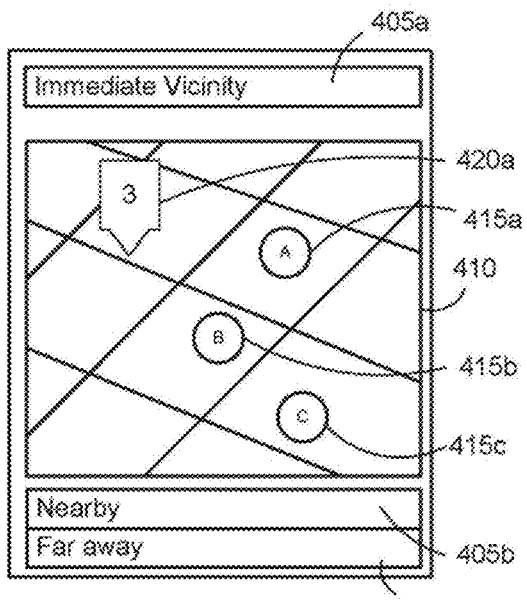
FIGS. 4A-D illustrate a series of sample screenshots illustrating how a client device may display information regarding nearby activities relevant to a user of a social networking system responsive to the user's request.

FIGS. 4A-D are a series of sample screenshots illustrating how a client device 110 may display information regarding nearby activities relevant to a user of a social networking system 130 responsive to the user's request. In FIG. 4A, a map 410 illustrates the real world region around the requesting user. The map 410 displays a number of content objects 415 that have been determined to be the most relevant content objects according to their relevance scores, which are based in part on the requesting user's location.

Content objects are presented as pins (e.g., pins A 415*a*, B 415*b*, and C 415*c*) based on the real world locations where the requesting user may interact with the real world entity associated with the content objects. For example, the content object may be a third-party content object comprising a coupon for a free smoothie at a smoothie store. In this example, pin 415 may represent the location of the smoothie store where the coupon is redeemable. In another example, pin 415 may represent the location where three of their friends are currently located.

In some circumstances, multiple content objects presented to the requesting user as pins 415 may be in such close proximity in the real world, that the map 410 is unable to display the multiple pins in a separate, independently identifiable manner. In one embodiment, pins in close proximity are grouped into a single, differently shaped group pin 420 that represents multiple content objects at once. A group pin 420 may visually indicate the number of pins 415 contained within the group pin 420. For example, group pin 420a indicates that three separate pins are contained within the group pin 420a.

In response to a request for information from a user, map 410 initially displays the area immediately surrounding the user. The user, however, may change the real world area illustrated by map 410. The user may also change the level of zoom at which the surrounding real world area is shown. FIG. 4A further illustrates that the requesting user is presented with multiple zoom settings 405 to allow a requesting user to switch between different zoom levels of the surrounding environment. In the example embodiment of FIG. 4A, the zoom levels include the immediate vicinity of the requesting user 405a as the highest granularity zoom level, a nearby zoom level 405b including a larger swath of the surrounding area as compared with the immediate vicinity 405a, and a far away zoom level 405c that covers a much larger scope than the previous two zoom levels. FIG. 4A illustrates a map 410 displayed at the immediate vicinity 405a zoom level.

In one embodiment, the zoom levels are based on absolute distances from the requesting user. For example, in the immediate vicinity 405a, the map 410 may cover one square mile, whereas the nearby zoom level 405b covers five square miles, and the far away zoom level 405c covers fifty square miles. In another embodiment, zoom levels may be based in part upon the geographical location of the users, whereby zoom levels are specified for various cities, states, and suburban areas. For example, if the user is located in the bay area of California, the far away zoom level 405c may be the entire bay area rather than fixed fifty mile distance.

Map 410 is configured to display only a limited number of pins 415 or block pins 420. The number of pins 415 or block pins 420 displayed may be determined by the social networking system 130 or the requesting user. In one embodiment, the number of pins 415 or block pins 420 is a fixed amount. In another embodiment, the number of pins 415 or block pins 420 is based on a relevance score threshold. Only content objects above the relevance score threshold are displayed as part of pins 415 or block pins 420. The relevance score threshold may vary depending upon the zoom level. For example, at a immediate vicinity zoom level 405a, there may be comparatively few content objects that are present to provide to the requesting user, and thus the relevance score threshold for this zoom level may be lower. In contrast, at a far away zoom level 405c, there may be many more content objects as compared to the immediate vicinity zoom level 405a case, and as a result the relevance score threshold for this zoom level may be higher. Thus, a requesting user changing from a smaller zoom level to a larger zoom level may reflect the user's interest in receiving information about more relevant content objects, despite the fact that they are further away from the requesting user's present location. Adjusting the relevance score threshold based on zoom level ensures that the user is always presented with a sufficient, but not excessive, number of pins 415 and block pins 420 to interact with.

Figure 4B:
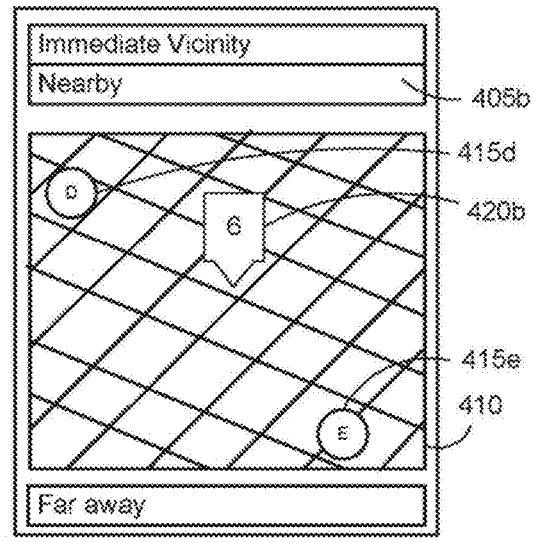

FIG. 4B illustrates the map 410 at the nearby zoom level 405b. In the example embodiment of FIG. 4B, group pin 420b indicates that it includes six pins, for example group pin 420a and pins 420a, 420b, and 420c, along with three others that were not present in map 410 as displayed in FIG. 4A. FIG. 4B further includes two new pins 415d, and 415e.

Figure 4C:
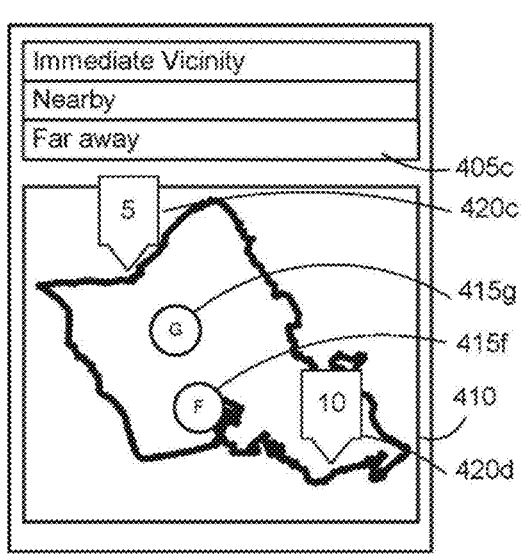

FIG. 4C illustrates the map 410 at the far away zoom level 405c. Group pins 420d and 420e include ten and five pins, respectively. Pins 415g and 415f represent individual content objects that are sufficiently far from other pins to be displayed separately from group pins, despite the area covered by map 410.

Figure 4D:
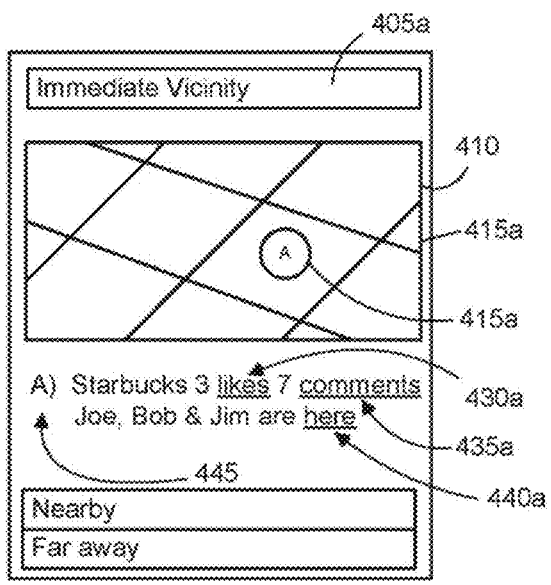

FIG. 4D illustrates a user interface presenting a requesting user with more information about a selected content object 445 illustrated by a pin 415a. In one embodiment, map 410 still presents the selected pin, however the map has been reduced in size with respect to the total screen area of the user device 110. The user interface presents information about the selected content object 445. The presented information may include, for example, the users of the social networking system 130 who have indicated affinity for the content object who are also connected to the requesting user through the social networking system, comments on the content object made by users connected with the requesting user through the social networking system, and/or a list of users connected with the requesting user through the social networking system who are currently present at the real-world location associated with the content object.

Social Graph

Figure 5:
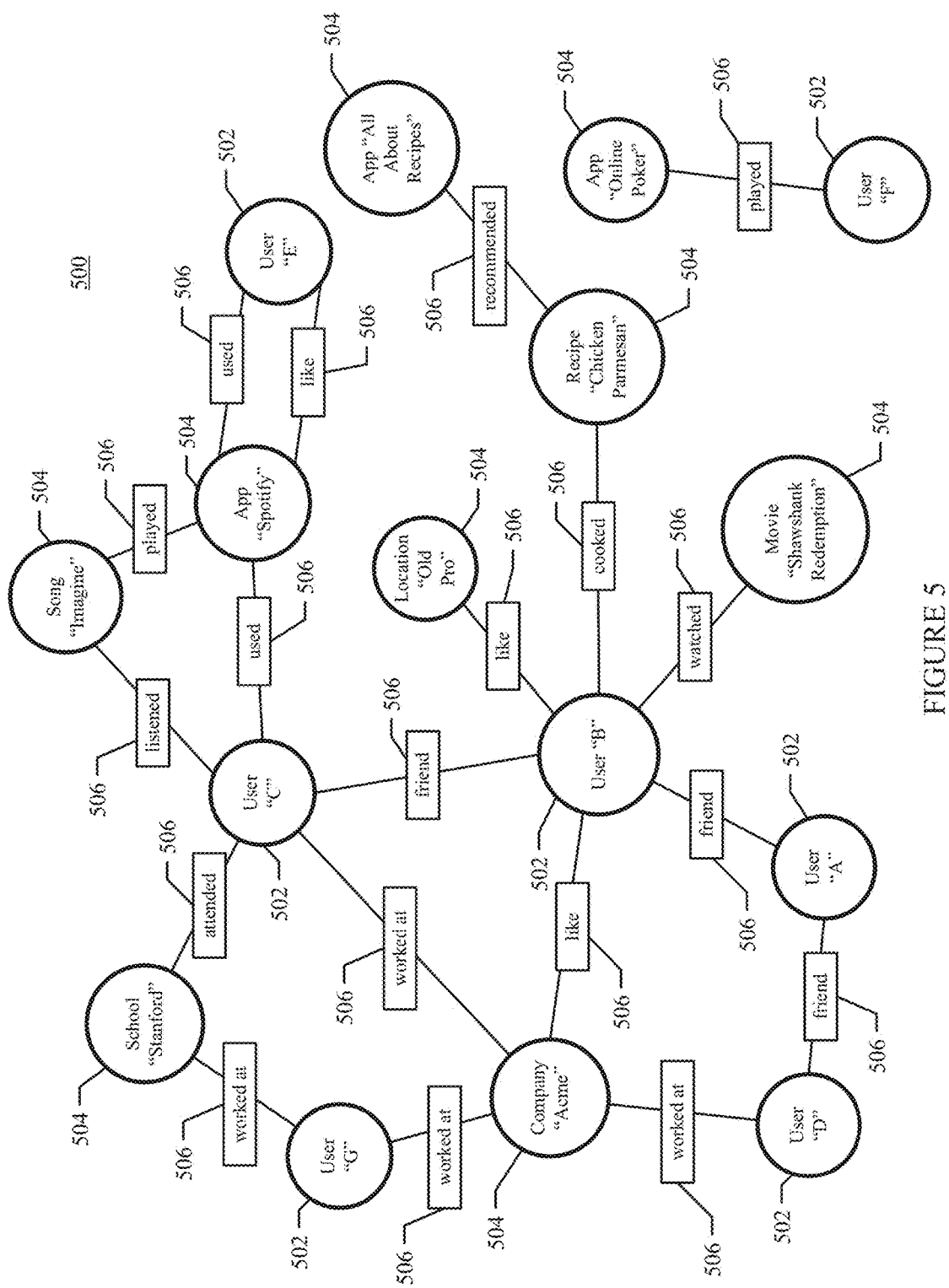
FIG. 5 illustrates an example social graph.

FIG. 5 illustrates example social graph 500. In particular embodiments, social-networking system 160 may store one or more social graphs 500 in one or more data stores. In particular embodiments, social graph 500 may include multiple nodes which may include multiple user nodes 502 or multiple concept nodes 504 and multiple edges 506 connecting the nodes. Example social graph 500 illustrated in FIG. 5 is shown, for didactic purposes, in a two-dimensional visual map representation. In particular embodiments, a social-networking system 160, client system 130, or third-party system 170 may access social graph 500 and related social-graph information for suitable applications. The nodes and edges of social graph 500 may be stored as data objects, for example, in a data store (such as a social-graph database). Such a data store may include one or more searchable or queryable indexes of nodes or edges of social graph 500.

In particular embodiments, a user node 502 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 502 corresponding to the user, and store the user node 502 in one or more data stores. Users and user nodes 502 described herein may, where appropriate, refer to registered users and user nodes 502 associated with registered users. In addition or as an alternative, users and user nodes 502 described herein may, where appropriate, refer to users that have not registered with social-networking system 160. In particular embodiments, a user node 502 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 502 may be associated with one or more data objects corresponding to information associated with a user. In particular embodiments, a user node 502 may correspond to one or more webpages.

In particular embodiments, a concept node 504 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 504 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 504 may be associated with one or more data objects corresponding to information associated with concept node 504. In particular embodiments, a concept node 504 may correspond to one or more webpages.

In particular embodiments, a node in social graph 500 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 504. Profile pages may be viewable by all or a selected subset of other users. As an example and not by way of limitation, a user node 502 may have a corresponding user-profile page in which the corresponding user may add content, make declarations, or otherwise express himself or herself. As another example and not by way of limitation, a concept node 504 may have a corresponding concept-profile page in which one or more users may add content, make declarations, or express themselves, particularly in relation to the concept corresponding to concept node 504.

In particular embodiments, a concept node 504 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 502 corresponding to the user and a concept node 504 corresponding to the third-party webpage or resource and store edge 506 in one or more data stores.

In particular embodiments, a pair of nodes in social graph 500 may be connected to each other by one or more edges 506. An edge 506 connecting a pair of nodes may represent a relationship between the pair of nodes. In particular embodiments, an edge 506 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 506 connecting the first user's user node 502 to the second user's user node 502 in social graph 500 and store edge 506 as social-graph information in one or more of data stores 24. In the example of FIG. 5, social graph 500 includes an edge 506 indicating a friend relation between user nodes 502 of user "A" and user "B" and an edge indicating a friend relation between user nodes 502 of user "C" and user "B." Although this disclosure describes or illustrates particular edges 506 with particular attributes connecting particular user nodes 502, this disclosure contemplates any suitable edges 506 with any suitable attributes connecting user nodes 502. As an example and not by way of limitation, an edge 506 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 500 by one or more edges 506.

In particular embodiments, an edge 506 between a user node 502 and a concept node 504 may represent a particular action or activity performed by a user associated with user node 502 toward a concept associated with a concept node 504. As an example and not by way of limitation, as illustrated in FIG. 5, a user may "like," "attended," "played," "listened," "cooked," "worked at," or "watched" a concept, each of which may correspond to a edge type or subtype. A concept-profile page corresponding to a concept node 504 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 506 and a "used" edge (as illustrated in FIG. 5) between user nodes 502 corresponding to the user and concept nodes 504 corresponding to the song and application to indicate that the user listened to the song and used the application. Moreover, social-networking system 160 may create a "played" edge 506 (as illustrated in FIG. 5) between concept nodes 504 corresponding to the song and the application to indicate that the particular song was played by the particular application. In this case, "played" edge 506 corresponds to an action performed by an external application (SPOTIFY) on an external audio file (the song "Imagine"). Although this disclosure describes particular edges 506 with particular attributes connecting user nodes 502 and concept nodes 504, this disclosure contemplates any suitable edges 506 with any suitable attributes connecting user nodes 502 and concept nodes 504. Moreover, although this disclosure describes edges between a user node 502 and a concept node 504 representing a single relationship, this disclosure contemplates edges between a user node 502 and a concept node 504 representing one or more relationships. As an example and not by way of limitation, an edge 506 may represent both that a user likes and has used at a particular concept. Alternatively, another edge 506 may represent each type of relationship (or multiples of a single relationship) between a user node 502 and a concept node 504 (as illustrated in FIG. 5 between user node 502 for user "E" and concept node 504 for "SPOTIFY").

In particular embodiments, social-networking system 160 may create an edge 506 between a user node 502 and a concept node 504 in social graph 500. As an example and not by way of limitation, a user viewing a concept-profile page (such as, for example, by using a web browser or a special-purpose application hosted by the user's client system 130) may indicate that he or she likes the concept represented by the concept node 504 by clicking or selecting a "Like" icon, which may cause the user's client system 130 to transmit to social-networking system 160 a message indicating the user's liking of the concept associated with the concept-profile page. In response to the message, social-networking system 160 may create an edge 506 between user node 502 associated with the user and concept node 504, as illustrated by "like" edge 506 between the user and concept node 504. In particular embodiments, social-networking system 160 may store an edge 506 in one or more data stores. In particular embodiments, an edge 506 may be automatically formed by social-networking system 160 in response to a particular user action. As an example and not by way of limitation, if a first user uploads a picture, watches a movie, or listens to a song, an edge 506 may be formed between user node 502 corresponding to the first user and concept nodes 504 corresponding to those concepts. Although this disclosure describes forming particular edges 506 in particular manners, this disclosure contemplates forming any suitable edges 506 in any suitable manner.

Making Recommendations to a User Based on Geolocation

Figure 6:
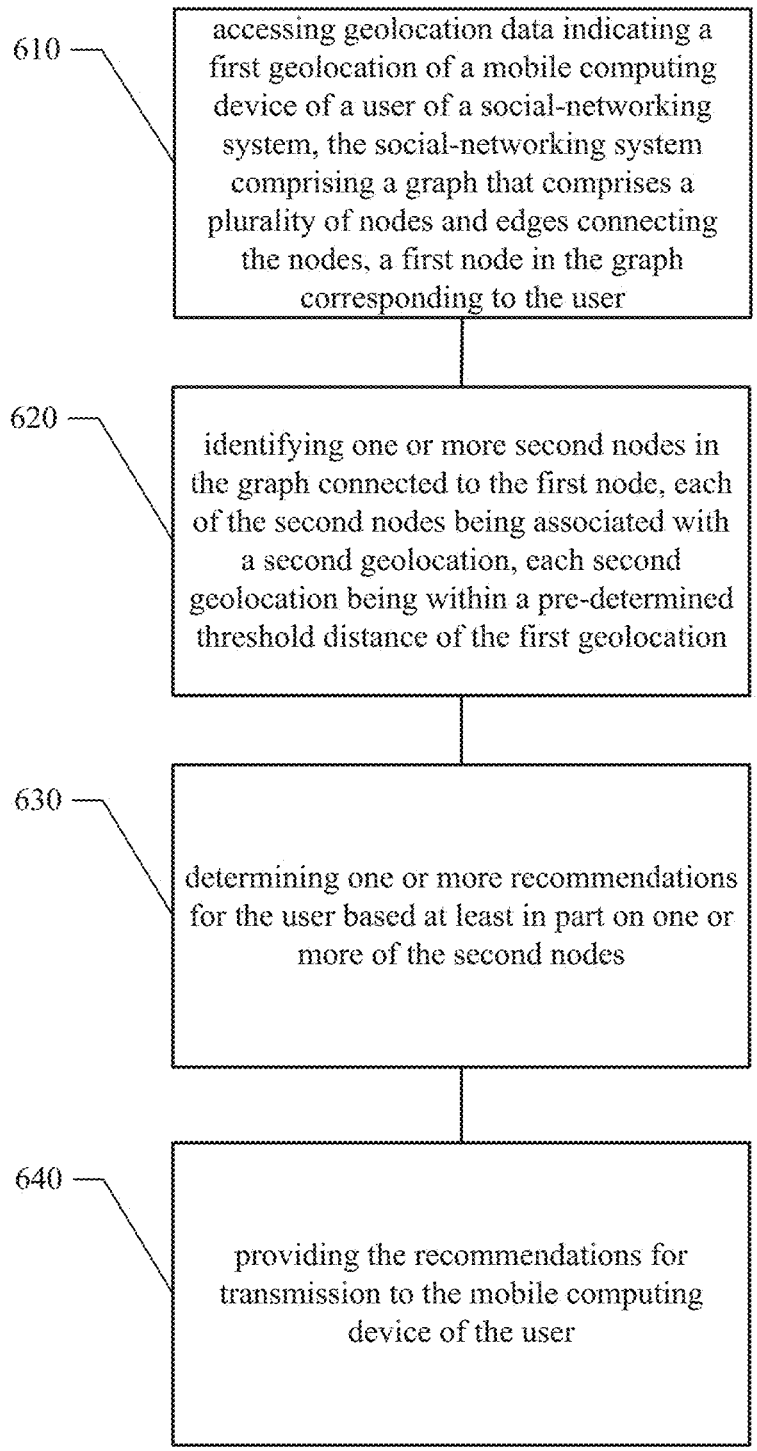
FIG. 6 illustrates an example method for making recommendations to a user based on geolocation.

FIG. 6 illustrates an example method for making recommendations to a user based on geolocation. The method may start at step 610, where the social-networking system accesses geolocation data to determine a geolocation (i.e., geographical location) for the mobile computing device of a user 110. This geolocation data may be stored in the location store 255 or it may be retrieved directly from the user device 110.

At step 620, the social-networking system identifies one or more nodes that are associated with geolocations within a pre-determined distance of the geolocation of the user device 110, and connected to the node for the first user. In particular embodiments, the pre-determined distance may be a static value (e.g., 5 miles). Alternatively, in particular embodiments, the pre-determined distance between the user's geolocation and the geolocation of the identified nodes is dynamic. This dynamic distance can vary based, at least in part, on the velocity of the user. In this embodiment, the pre-determined distance associated with a user traveling at a high velocity (e.g. in a car) will be larger than the pre-determined distance of a user traveling at a low velocity (e.g. walking). For example, when the user is traveling in a car, the distance may be within 10 miles because it only takes a few minutes to travel 10 miles by car. On the other hand, when the user is walking, the distance may be within 1 mile since it takes longer time to cover 1 mile on foot than by car.

In particular embodiments, the set of identified nodes can be further restricted based on the degree of separation between the user's node and the identified node. In this embodiment, each edge in the social graph represents a single degree of separation within the graph. For example, if two nodes are directly connected, there is one degree of separation between the two nodes. If two nodes are connected through a third node, there are two degrees of separation between the two nodes. And so on. In particular embodiments, in a social-networking system, the degree of separation between two nodes reflects how closely the two nodes are socially connected. Thus, a smaller degree of separation suggests that the two nodes are more closely connected from a social perspective, while a larger degree of separation suggests that the two nodes are less closely connected from a social perspective. The social-networking system can then limit the set of identified nodes based on a pre-determined threshold number of degrees of separation between the user node and the identified nodes. This way, only those nodes that are somewhat closely related to the user are selected for the user.

At step 630, the social-networking system determines one or more recommendations for the user based, at least in part, on the identified nodes. In particular embodiments, the one or more recommendations are drawn from a list of defined user recommendations. In this embodiment, the social-networking system first determines the type of content associated with the identified node (e.g. a user node, a photo node, a software-application node). The social network then determines the type or types of edges connecting the user's node with the identified node. Based on these determinations, the social-networking system is able to select one or more recommendations from the list of possible recommendations.

In a particular embodiment, the one or more recommendations are actions that the user may want to take. For example, the recommendations could include downloading a software application associated with a node that is geographically proximate to the user, contacting a second user that is geographically proximate to the user, viewing an image or video associated with a location geographically proximate to the user, or travelling to a location that is geographically proximate to the user. If the user's geolocation is within a specified distance of a sporting arena, the determined recommendations would include a recommendation that the user download an application associated with one of the sports teams playing. Alternatively, one of the user's friends on the social-networking system may have taken a photograph at the user's location. The determined recommendations would include a recommendation to the user to view the photograph. As another example, if one of the user's friends on the social-networking system may be in close proximity to the geolocation of the user, the determined recommendations may include a recommendation that the user contact the user's friend or that the user travel to the friend's geolocation and provide appropriate directions.

At step 640, the social-networking system provides the one or more recommendations for transmission to the user's mobile computing device, at which point the method may end. The one or more recommendations may be received by the mobile computing device when the device is locked or unlocked. In particular embodiments, the recommendations are presented on the mobile computing device as notifications pushed to the device. In particular embodiments the recommendations may be data that is automatically pushed to the mobile computing device by the social-networking system. In particular embodiments, the recommendations may be queued for later delivery to the mobile computing device. In particular embodiments the recommendations are queued for delivery when the mobile computing device is available on a non-cellular network.

Particular embodiments may repeat the steps of the method of FIG. 6, where appropriate. Moreover, although this disclosure describes and illustrates particular steps of the method of FIG. 6 as occurring in a particular order, this disclosure contemplates any suitable steps of the method of FIG. 6 occurring in any suitable order. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
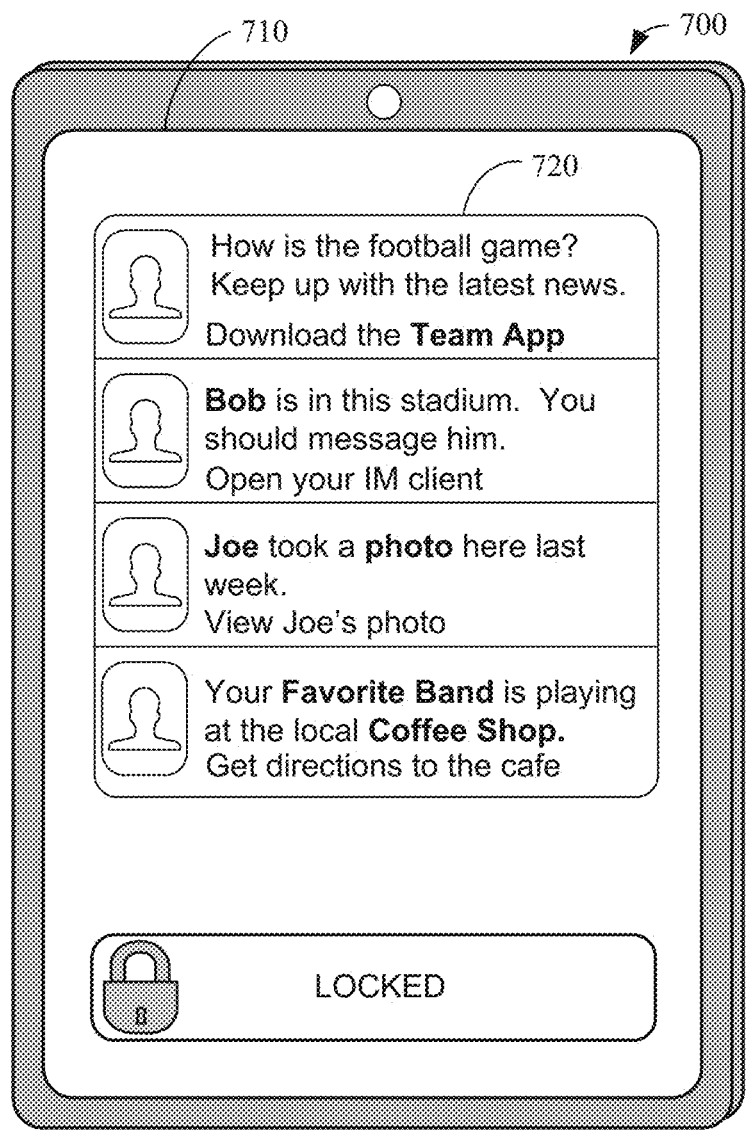
FIG. 7 illustrates an example user interface for handling recommendations.

FIG. 7 illustrates an example mobile computing device 700 with a screen 710. In particular embodiments, Screen 710 displays one or more recommendations 720 received by mobile computing device 700. In particular embodiments, recommendations may have been received at a user's mobile computing device while the user's personal computing device was locked. For example, a first recommendation may be a suggested action that the user download an application associated with the sporting event the user is attending, a second recommendation may be a suggested action that the user contact a friend that is in the same stadium, a third recommendation may be a suggested action that the user view a photograph taken by a friend in the same location, and a fourth recommendation comprises a notification that the user's favorite band is playing at the local coffee shop and offering directions to the coffee shop. In addition to the example illustrated in FIG. 7, an example presentation may comprise playing a sound using an audio output of the mobile computing device that represents the one or more recommendations, illuminating the screen or another visual indicator on the mobile computing device, or causing the mobile computing device to provide haptic output that represents the recommendation.

Figure 8:
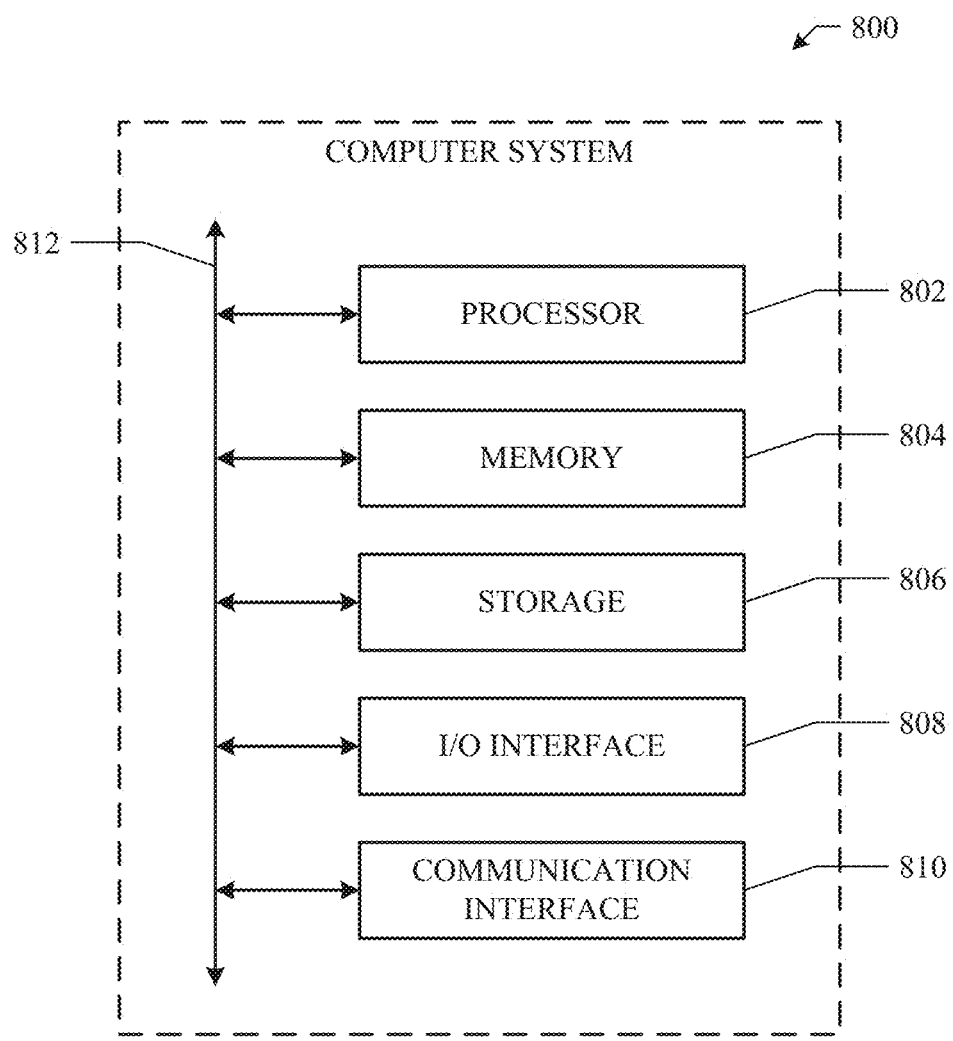
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, accessing geolocation data indicating a current geolocation of a client device of a user;
   by the computing device, identifying one or more categories of interest to the user based at least in part on actions of the user on a social-networking system with regard to one or more content objects associated with the category of interest;
   by the computing device, identifying one or more content objects on the social-networking system based at least in part on the current geolocation;
   by the computing device, identifying information associated with one or more of the content objects that is based at least in part on activity on the social-networking system with regard to the content objects;
   by the computing device, determining one or more recommendations for the user based at least in part on an interest value of each identified object, wherein the interest value is determined based at least in part on the identified categories of interest to the user and the current geolocation, and wherein the recommendations comprise one or more of the content objects and the information associated with the content objects; and
   by the computing device, providing the recommendations for transmission to the client device, wherein the recommendations comprise one or more of the identified objects.

2. The method of claim 1, further comprising:
   ranking the recommendations based at least in part on the interest value.

3. The method of claim 2, wherein the ranking is further based at least in part on a proximity of a location associated with each identified object to the current geolocation.

4. The method of claim 1, further comprising:
   receiving updated location information in response to a change in the location of a client device; and
   identifying one or more additional objects based in part on the updated location information.

5. The method of claim 4, further comprising ranking the recommendations identified additional objects based at least in part on the interest value.

6. The method of claim 1, wherein the identifying of the categories of interest is further based on profile information of the user on the social-networking system.

7. The method of claim 1, wherein the actions of the user are stored on a social graph, wherein the social-graph comprises:
   a plurality of nodes, wherein a first node corresponds to the user, and wherein one or more second nodes correspond to another user; and
   one or more edges connecting the first node to the second nodes.

8. The method of claim 7, wherein one or more of the categories of interest to the user are identified based at least in part on interests of another user corresponding to a particular one of the second nodes connected to the first node corresponding to the user.

9. The method of claim 1, wherein one or more of the objects comprises a plurality of third party content objects, wherein one or more of the plurality of content objects comprises an informational content object or incentive content object.

10. The method of claim 9, wherein the informational content objects comprise movie show times of movies or menus of restaurants.

11. The method of claim 9, wherein the incentive content objects comprise coupons, discount tickets, or gift certificates.

12. The method of claim 1, wherein the geolocation data comprises:
   Global Positioning System (GPS) data;
   cellular-triangulation data;
   data manually provided by the user; or
   route data.

13. The method of claim 1, wherein the recommendations are provided to the client device as a ranked list.

14. The method of claim 1, wherein the recommendations are provided to the client device as part of a map displayed on the client device.

15. One or more computer-readable non-transitory storage media embodying software that is operable when executed to:
- access geolocation data indicating a current geolocation of a client device of a user;
- identify one or more categories of interest to the user based at least in part on actions of the user on a social-networking system with regard to one or more content objects associated with the category of interest;
- identify one or more content objects stored on the social-networking system based at least in part on the current geolocation;
- identify information associated with one or more of the content objects that is based at least in part on activity on the social-networking system with regard to the content objects;
- determine one or more recommendations for the user based at least in part on an interest value of each identified object, wherein the interest value is determined based at least in part on the identified categories of interest to the user and the current geolocation, and wherein the recommendations comprise one or more of the content objects and the information associated with the content objects; and
- provide the recommendations for transmission to the client device, wherein the recommendations comprise one or more of the identified objects.

16. The media of claim 15, wherein the software is further operable to rank the recommendations based at least in part on the interest value.

17. The media of claim 16, wherein the ranking is further based at least in part on a proximity of a location associated with each identified object to the current geolocation.

18. A computing device comprising:
- a processor; and
- a memory coupled to the processor comprising instructions executable by the processor, the processor being operable when executing the instructions to:
  - access geolocation data indicating a current geolocation of a client device of a user;
  - identify one or more categories of interest to the user based at least in part on actions of the user on a social-networking system with regard to one or more content objects associated with the category of interest;
  - identify one or more content objects stored on the social-networking system based at least in part on the current geolocation;
  - identify information associated with one or more of the content objects that is based at least in part on activity on the social-networking system with regard to the content objects;
  - determine one or more recommendations for the user based at least in part on an interest value of each identified object, wherein the interest value is determined based at least in part on the identified categories of interest to the user and the current geolocation, and wherein the recommendations comprise one or more of the content objects and the information associated with the content objects; and
  - provide the recommendations for transmission to the client device, wherein the recommendations comprise one or more of the identified objects.

19. The device of claim 18, wherein the processor is further operable to rank the recommendations based at least in part on the interest value.

20. The device of claim 19, wherein the ranking is further based at least in part on a proximity of a location associated with each identified object to the current geolocation.

21. The device of claim 18, wherein the processor is further operable to: receive updated location information in response to a change in the location of a client device; and
- identify one or more additional objects based in part on the updated location information.

22. The device of claim 21, wherein the processor is further operable to rank the recommendations identified additional objects based at least in part on the interest value.

23. The device of claim 18, wherein identifying the categories of interest is further based on profile information of the user on the social-networking system.

24. The device of claim 18, wherein the actions of the user are stored on a social graph, wherein the social-graph comprises:
- a plurality of nodes, wherein a first node corresponds to the user, and wherein one or more second nodes correspond to another user; and
- one or more edges connecting the first node to the second nodes.

25. The device of claim 24, wherein one or more of the categories of interest to the user are identified based at least in part on interests of another user corresponding to a particular one of the second nodes connected to the first node corresponding to the user.

26. The device of claim 18, wherein one or more of the objects comprises a plurality of third party content objects, wherein one or more of the plurality of content objects comprises an informational content object or incentive content object.

27. The device of claim 26, wherein the informational content objects comprise movie show times of movies or menus of restaurants.

28. The device of claim 26, wherein the incentive content objects comprise coupons, discount tickets, or gift certificates.

29. The device of claim 18, wherein the geolocation data comprises:
- Global Positioning System (GPS) data;
- cellular-triangulation data;
- data manually provided by the user; or
- route data.

30. The device of claim 18, wherein the recommendations are provided to the client device as a ranked list.

31. The device of claim 18, wherein the recommendations are provided to the client device as part of a map displayed on the client device.

32. The media of claim 15, wherein the software is further operable to:
- receive updated location information in response to a change in the location of a client device; and
- identify one or more additional objects based in part on the updated location information.

33. The media of claim 32, wherein the software is further operable to rank the recommendations identified additional objects based at least in part on the interest value.

34. The media of claim 15, wherein identifying the categories of interest is further based on profile information of the user on the social-networking system.

35. The media of claim 15, wherein the actions of the user are stored on a social graph, wherein the social-graph comprises:
- a plurality of nodes, wherein a first node corresponds to the user, and wherein one or more second nodes correspond to another user; and one or more edges connecting the first node to the second nodes.

36. The media of claim 35, wherein one or more of the categories of interest to the user are identified based at least in part on interests of another user corresponding to a particular one of the second nodes connected to the first node corresponding to the user.

37. The media of claim 15, wherein one or more of the objects comprises a plurality of third party content objects, wherein one or more of the plurality of content objects comprises an informational content object or incentive content object.

38. The media of claim 37, wherein the informational content objects comprise movie show times of movies or menus of restaurants.

39. The media of claim 37, wherein the incentive content objects comprise coupons, discount tickets, or gift certificates.

40. The media of claim 15, wherein the geolocation data comprises:
   Global Positioning System (GPS) data;
   cellular-triangulation data;
   data manually provided by the user; or
   route data.

41. The media of claim 15, wherein the recommendations are provided to the client device as a ranked list.

42. The media of claim 15, wherein the recommendations are provided to the client device as part of a map displayed on the client device.

* * * * *